(12) United States Patent
Lemke et al.

(10) Patent No.: US 11,558,933 B2
(45) Date of Patent: Jan. 17, 2023

(54) CONTROL SYSTEM FOR CONTROLLING A HEATER

(71) Applicant: WATLOW ELECTRIC MANUFACTURING COMPANY, St. Louis, MO (US)

(72) Inventors: John Lemke, Houston, MN (US); Martin Currie, Winona, MN (US); William Bohlinger, Winona, MN (US); Stanton H. Breitlow, St. Louis, MO (US); Adam Kidney, Winona, MN (US); Kurt Peterson, LaCrosse, WI (US); James Hentges, Winona, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 702 days.

(21) Appl. No.: 16/294,201

(22) Filed: Mar. 6, 2019

(65) Prior Publication Data
US 2019/0281664 A1 Sep. 12, 2019

Related U.S. Application Data

(60) Provisional application No. 62/640,143, filed on Mar. 8, 2018.

(51) Int. Cl.
H05B 1/02 (2006.01)
H05B 3/42 (2006.01)
G05D 23/19 (2006.01)

(52) U.S. Cl.
CPC ....... H05B 1/0288 (2013.01); G05D 23/1934 (2013.01); H05B 1/0291 (2013.01); H05B 3/42 (2013.01)

(58) Field of Classification Search
CPC ...... H05B 1/02; H05B 1/0291; H05B 1/0288; H05B 3/42; H05B 2203/005;
(Continued)

(56) References Cited

U.S. PATENT DOCUMENTS 4,223,385 A * 9/1980 Miller ................. F27B 9/40
432/51
4,554,437 A * 11/1985 Wagner ................ A21B 1/48
219/388

(Continued)

FOREIGN PATENT DOCUMENTS

| CN | 107078082 A | 8/2017 |
|---|---|---|
| EP | 0884406 | 12/1998 |
| TW | 373233 | 11/1999 |

OTHER PUBLICATIONS

International Search Report for International Application PCT/US2019/020936, dated May 27, 2019.
(Continued)

Primary Examiner — John J Norton
(74) Attorney, Agent, or Firm — Burris Law, PLLC

(57) ABSTRACT

The present disclosure is directed toward a control system for controlling a heater system. The control system includes a plurality of zone control circuits, at least two auxiliary controllers, and a primary controller. The zone control circuits are operable to provide power to a plurality of heater zones of the heater system and to sense performance characteristics of the zones. The auxiliary controllers are coupled to the plurality of zone control circuits to control power to the plurality of zones and to monitor operation of the heater zones based on the performance characteristics. The primary controller is coupled to the auxiliary controllers and is configured to provide an operation set-point for each of the heater zones based on the performance characteristics. The auxiliary controllers operate the zone control circuits to (Continued)

supply power to the heater system based on the operation set-point.

21 Claims, 4 Drawing Sheets

(58) Field of Classification Search
 CPC ............ H05B 2203/007; H05B 1/0227; H05B 1/023; H05B 1/0233; H05B 1/0294; G05D 23/193–1935
 USPC .................. 219/483–486, 481, 497, 494
 See application file for complete search history.

(56) References Cited

U.S. PATENT DOCUMENTS

| | | | | |
|---|---|---|---|---|
| 4,947,928 A | * | 8/1990 | Parker | F24F 11/76 165/238 |
| 5,001,327 A | * | 3/1991 | Hirasawa | H01L 21/67109 219/390 |
| 5,105,067 A | * | 4/1992 | Brekkestran | G05D 23/2401 2/69 |
| 5,900,177 A | * | 5/1999 | Lecouras | C30B 31/12 219/486 |
| 6,176,924 B1 | * | 1/2001 | Duval | C30B 11/00 117/14 |
| 6,242,720 B1 | * | 6/2001 | Wilson | F24H 9/2021 219/486 |
| 6,911,628 B1 | * | 6/2005 | Hirayama | G05B 5/01 219/486 |
| 7,932,480 B2 | * | 4/2011 | Gu | G05D 23/22 219/482 |
| 2004/0099653 A1 | | 5/2004 | Hirayama et al. | |
| 2005/0109767 A1 | | 5/2005 | Fennewald et al. | |
| 2006/0081719 A1 | * | 4/2006 | Nguyen | H05B 1/023 236/49.3 |
| 2008/0193584 A1 | | 8/2008 | Cooke | |

OTHER PUBLICATIONS

Office Action issued in corresponding CN Application No. 201980017689.8 dated Jun. 29, 2022, 6 pages.

* cited by examiner

CONTROL SYSTEM FOR CONTROLLING A HEATER

CROSS-REFERENCE TO RELATED APPLICATIONS

The present application claims the benefit of and priority to U.S. Provisional Application No. 62/640,143 filed on Mar. 8, 2018. The content of the above application is incorporated herein by reference in its entirety.

FIELD

The present disclosure relates to a system and/or method for controlling a thermal system having a heater with power-sense control.

BACKGROUND

The statements in this section merely provide background information related to the present disclosure and may not constitute prior art.

Resistive heaters are used in a variety of applications to provide heat to a target and/or environment. For example, such resistive heaters include, but are not limited to: cartridge heaters, fluid line heater, or other suitable heaters. A control system typically controls the power to the resistive heater to regulate the amount of heat being generated by the heater.

In some applications, the control system is a closed loop system that receives feedback data from discrete sensors that monitor the performance of the resistive heaters. While the discrete sensors provide data to fine tune control of the resistive heaters, the sensors can take up space and add complexity to the overall thermal system. These and other issues are addressed by the present disclosure.

SUMMARY

This section provides a general summary of the disclosure and is not a comprehensive disclosure of its full scope or all of its features.

In one form, the present disclosure is directed toward a control system that includes a plurality of zone control circuits, at least two auxiliary controllers, and a primary controller. The plurality of zone control circuits are operable to provide power to a plurality of heater zones of a heater system and to sense performance characteristics of the zones. The auxiliary controllers are coupled to the plurality of zone control circuits. The auxiliary controllers control power to the plurality of zones and monitor operation of the heater zones based on the performance characteristics. The primary controller is coupled to the auxiliary controllers, and is configured to provide an operation set-point for each of the heater zones based on the performance characteristics. The auxiliary controllers operate the zone control circuits to supply power to the heater system based on the operation set-point.

In another form, each of the auxiliary controllers includes a power controller and a sensor controller. Each power controller and each sensor controller is coupled to the primary controller, and the sensor controllers are coupled to each other and to each of the plurality of zone control circuits. In one variation, each power controller is coupled to a set of the zone control circuits different from another power controller.

In yet another form, the control system further includes a power supply switch operable to couple and decouple a power source to the control system. In one variation, the primary controller and the auxiliary controllers are coupled to the power supply switch. The primary controller and each of the auxiliary controllers are configured to perform at least one diagnostic, and the primary controller and each of the auxiliary controllers are configured to operate the power supply switch based on the at least one diagnostic.

In one form, the each of the zone control circuits includes a power module to provide power to the heater zone and a sensor module to measure electrical characteristics of the heater zone. In one variation, each of the sensor modules is coupled to both of the auxiliary controllers, and the power modules are provided in sets, such that each set of power modules is coupled to an auxiliary controller different from another set of power modules.

In another form, each of the auxiliary controllers is configured to perform a diagnostic based on the performance characteristics to determine whether each zone is operating within a defined operation parameter, and the auxiliary controllers exchange result of the diagnostic to perform a diagnostic verification check.

In yet another form, the auxiliary controllers receive electrical characteristics from the zone control circuits, and based on the electrical characteristics calculate the performance characteristics, perform a diagnostic, or both calculate the performance characteristics and perform the diagnostic.

In one form, a thermal system includes the control system described herein and a heater system that includes a plurality of resistive heating elements that define a plurality of zones. Each of the plurality of resistive heating elements is coupled to the control system and have power-sense capability, such that the control system provides power and measures performance characteristics of the resistive heating element.

In one form, the present disclosure is directed towards a control system that includes a plurality of zone control circuits, at least two auxiliary controllers, a primary controller, and power supply switch. The plurality of zone control circuits are operable to provide power to a plurality of zones of a heater system and measure electrical characteristics of the zones. The auxiliary controllers are coupled to the plurality of zone control circuits to control power to the zones of the heater system. The auxiliary controllers measure a performance characteristic of the heater system based on the electrical characteristics and perform at least one diagnostic based on the electrical characteristics. The primary controller is coupled to the auxiliary controllers, and provides an operation set-point for each of the zones of the heater based on the performance characteristic of the heater system. The power supply switch coupled to the primary controller and to each of the auxiliary controllers, wherein the power supply switch is operable to couple and decouple a power source to the control system.

In another form, the primary controller executes one or more diagnostics to detect an abnormal performance, and operates the power supply switch to decouple the power source from the control system in response to detecting the abnormal performance.

In yet another form, the auxiliary controllers are coupled to each other, and each of the auxiliary controllers exchanges results with the other auxiliary controllers to perform a diagnostic verification check.

In one form, each of the zone control circuits includes a power module to control power to the zone and a sensor module to measure the electrical characteristics of the zone.

In one variation, each of the sensor modules is coupled to both of the auxiliary controllers, and the power modules are provided in sets, such that each set of power modules is coupled to an auxiliary controller different from another set of power modules. In another variation, each power module includes a power converter operable by an auxiliary controller from among the at least two auxiliary controllers to provide power to the zone of the heater system. In yet another variation, each sensor module is configured to measure a voltage, a current, or a combination thereof as the electrical characteristics of the zone. In another variation, each of the auxiliary control circuits is configured to calculate a temperature of the zone based on the electrical characteristics from the sensor module.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
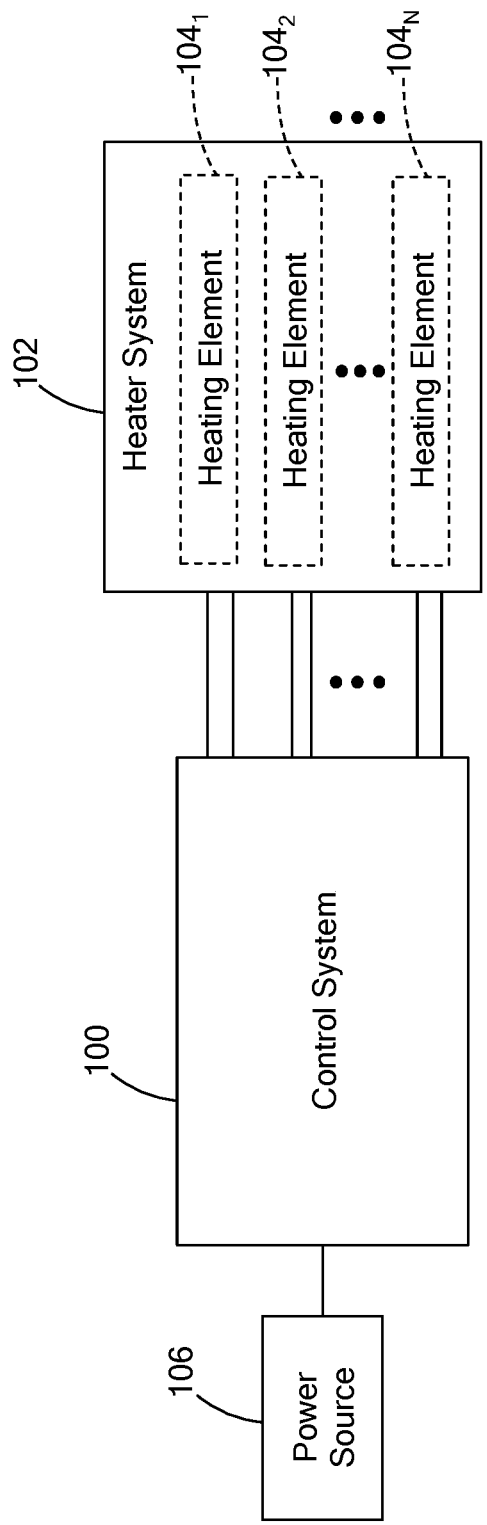
FIG. 1 is a block diagram of a thermal system having a control system in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A thermal system includes a heater system having multiple resistive heating elements and a control system that controls the operation of the heater system from supplying adjustable power to the resistive heating elements to performing system diagnostics. As part of a closed-loop control, discrete temperature sensors are disposed about the thermal system to measure various performance characteristics, such as temperature, voltage, current, resistance, etc. These discrete sensors can increase the size, cost, and complexity of the control system since each sensor would require a dedicated input/output interface (e.g., port, pin, etc) to the control system.

The heater system may have power-sense capability to allow the control system to provide power and measure performance characteristics of the heater system without the use of a discrete sensor. This may reduce the number of discrete sensors, but discrete sensors are still used to verify the measurement taken from the heater system.

The present disclosure is directed toward a control system that has sensor diagnostic capability for verifying measurements of the heater system and performing a protective measure in the event an abnormal performance is detected.

As described herein, the control system includes a primary controller for defining a power level for each resistive heating element, and at least two auxiliary controllers that provide power to the resistive heating elements and measure the performance characteristics of the heater system. Each auxiliary controller shares their data with the other auxiliary controller as part of a measurement verification or in other words, authentication check. In the event, a discrepancy between the measurements is dedicated, the auxiliary controller(s) notify the primary controller and/or perform a protective measure, such as discontinuing power to the heater system. In addition, each auxiliary controller performs one or more diagnostic to check the performance of the heater system. In the event of an abnormal performance, the auxiliary controllers may perform a protection measure to protect the thermal system.

Furthermore, the auxiliary controllers provide the performance characteristics to the primary controller, which further verifies the calculation and, performs one or more diagnostics to detect abnormal performance. Accordingly, the control system has at least two layer of protection to monitor the performance of the heater system, and the control system itself.

Referring to FIG. 1, the present disclosure is directed toward a control system 100 for a heater system 102 having one or more resistive heating elements $104_1$ to $104_N$ (collectively "heating elements 104"; "N" is an integer) that define multiple heating zone. Together, the control system 100 and the heater system 102 form a thermal system.

The control system 100 is electrically coupled to the resistive heating elements 104 and provides adjustable power to the heating elements 104 by converting a voltage input from a power source 106 to a desired voltage output that may be equal to less than the voltage input.

The heater system 102 has power-sensing capability that allows the control system 100 to provide power and measure performance characteristics of the heater system. For example, in one form, the heater system 102 may be a "two-wire" heater such that changes in resistance of the heating elements 104 can be used by the control system 100 to determine performance characteristics, such as temperature. Such a two-wire system is disclosed in U.S. Pat. No. 7,196,295, which is commonly owned with the present application and the contents of which are incorporated herein by reference in their entirety. In a two-wire system, the system is an adaptive thermal system that merges heater designs with controls that incorporate power, resistance, voltage, and current in a customizable feedback control system that limits one or more these parameters (i.e., power, resistance, voltage, current) while controlling another. The control system is configured to monitor at least one of current, voltage, and power delivered to the heater system over a period time to acquire stable continuous current and voltage readings. These readings can then be used for determining resistance, and thus, temperature of the heating elements of the heater system.

Figure 2:
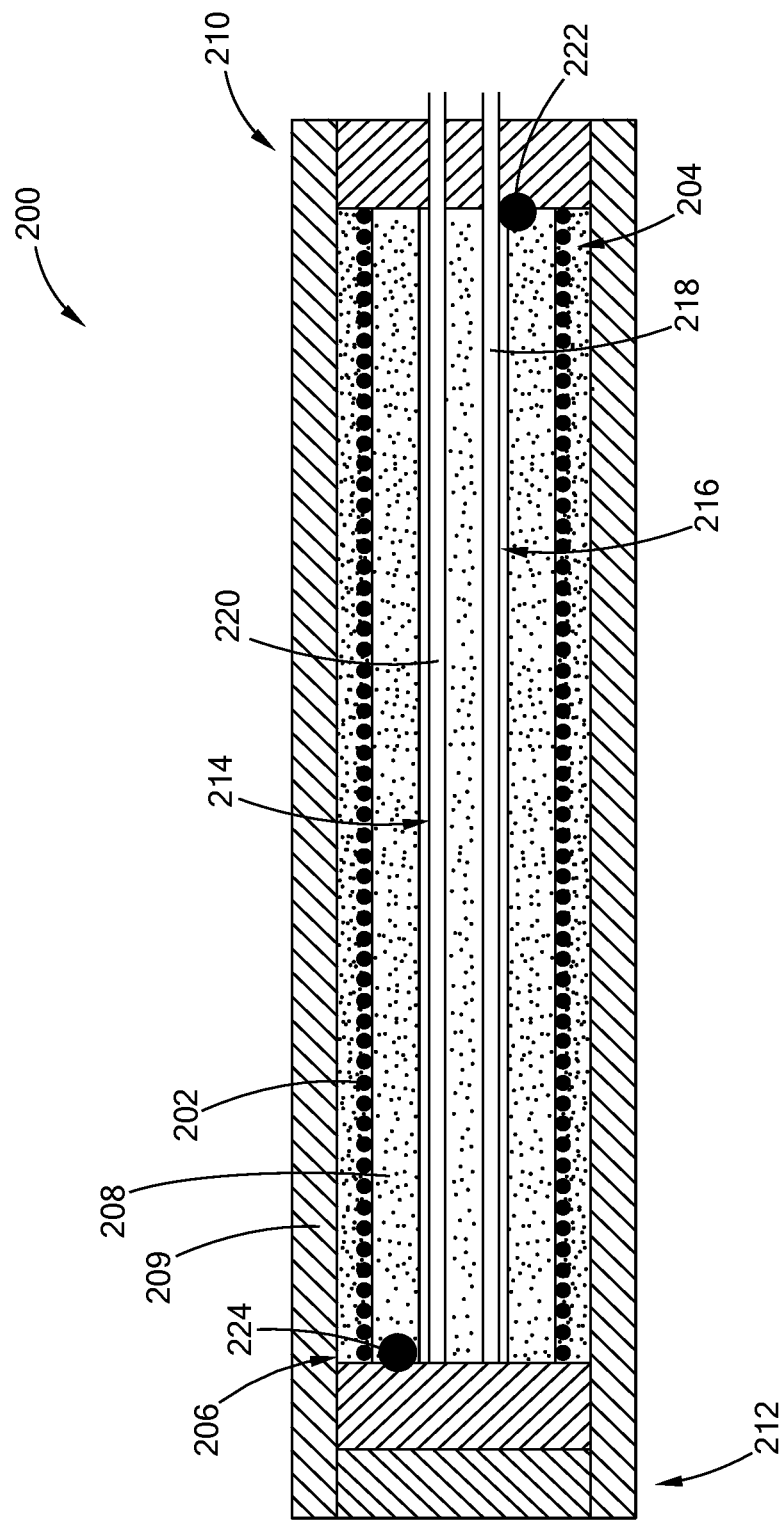
FIG. 2 is an example of a cartridge heater having temperature sensing power pins.

In another example, the heating element 104 of the heater system 102 may have temperature sensing power pins to connect to the control system 100. More particularly, referring to FIG. 2, the heater system 102 may include multiple cartridge heaters, such as a cartridge heater 200 that includes a resistive heating element 202 having two end portions 204 and 206. In one form, the resistive heating element 202 is in the form of a metal wire, such as a nichrome material by way of example, and is wound or disposed around a non-conductive portion (or core 208 that is surrounded by a sheath 209. The core 208 defines a proximal end 210 and a distal end 212 and further defines first and second apertures 214 and 216 extending through at least the proximal end 210.

The cartridge heater 200 further comprises a first power pin 218 that is made of a first conductive material and a second power pin 220 that is made of a second conductive material that is dissimilar from the first conductive material of the first power pin 218. Further, the resistive heating element 202 is made of a material that is different from the first and second conductive materials of the first and second power pins 218, 220 and forms a first junction 222 at end 204 with the first power pin 218 and a second junction 224 at its other end 206 with the second power pin 220. Because the resistive heating element 202 is a different material than the first power pin 218 at junction 222 and is a different material than the second power pin 220 at junction 224, a thermocouple junction is effectively formed. Accordingly, changes in voltage at the first and second junctions 222, 224 are detected to determine an average temperature of the cartridge heater 200 without the use of a separate/discrete temperature sensor.

Additional detail regarding the temperature sensing power pins is provided in Applicant's co-pending applications having U.S. Ser. No. 14/725,537, filed May 29, 2015 and titled "RESISTIVE HEATER WITH TEMPERATURE SENSING POWER PINS" and U.S. Ser. No. 15/950,358 filed Apr. 11, 2018 and titled "RESISTIVE HEATER WITH TEMPERATURE SENSING POWER PINS AND AUXILIARY SENSING JUNCTION." These applications are incorporated herein by reference in their entirety, and disclose a heater having one or more resistive heating elements that are connected to power pins that function as a thermocouple sensing pins to measure the temperature of the resistive heating element. According to the application, a controller is in communication with the power pins, and is configured to measure changes in voltage (mV) at the junctions formed by the heater resistive element and the power pins and to calculate an average temperature of the resistive heater element. The temperature sensing power pins may be used with other heaters, such a fluid line heater(s), a fluid immersion heater(s), or other suitable heaters, and should not be limited to cartridge heaters.

Figure 3:
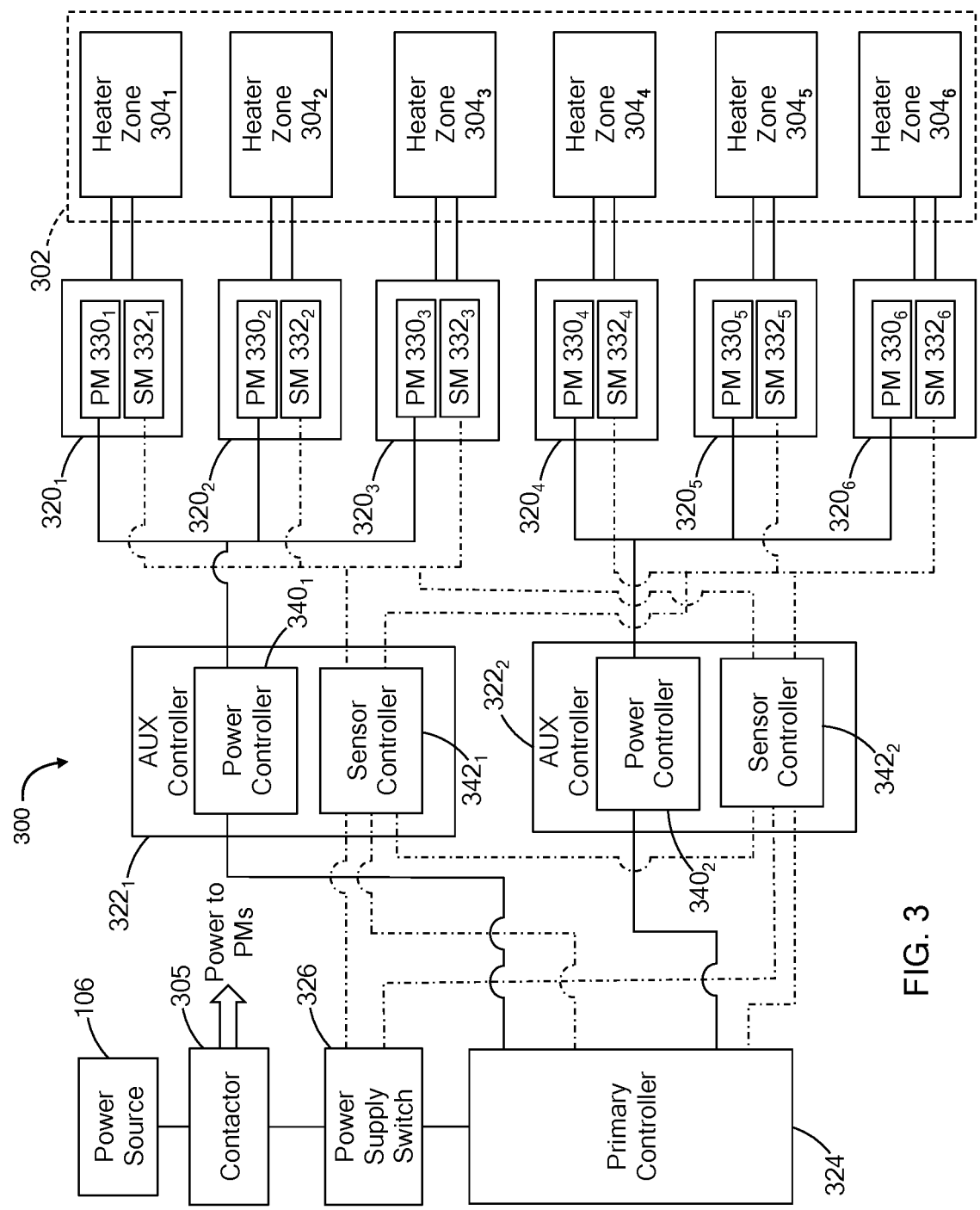
FIG. 3 is a block diagram of a control system for controlling a heater system having six heat zones.

Referring to FIG. 3, in one form, the control system 100 may be provided as a control system 300 that controls the operation of a heater system 302 having six heater zones $304_1$ to $304_6$ defined by multiple resistive heating elements (collectively "heater zones 304"). Like the heater system 102, the heater system 302 is has power-sensing capability and each heater zone 304 is electrically coupled to the control system 300. In one form, the control system 300 is coupled to the power source 106 via a contactor 305.

The control system 300 includes a plurality of zone control circuits $320_1$ to $320_6$ (collectively "zone control circuits 320"), at least two auxiliary (AUX) controllers $322_1$ and $322_2$ (collectively "auxiliary controllers 322"), a primary controller 324, and a power supply switch 326. It should be readily understood that the control system of the present disclosure can be configured to control any number of heater zones/heating elements (e.g., 2 or more), and thus, should not be limited to six.

In one form, the zone control circuits 320 are connected to the heater zones 304 to provide independent control of each heater zone 304. Each zone control circuit 320 includes a power module (PM) 330 ($330_1$ to $330_6$ in figure) to control power to a particular heater zone 304 and a sensor module (SM) 332 ($332_1$ to $332_6$ in figure) to measure electrical characteristics, such as voltage and/or current at the heating elements of the heater zone 304. Each sensor module 332 is coupled to both of the auxiliary controllers 322. The power modules 330 are provided in sets, such that each set of power modules 330 is coupled to an auxiliary controller 322 different from another set of power modules 330. For example, power modules $330_1$ to $330_3$ form one set that is coupled to auxiliary controller $322_1$, and power modules $330_4$ to $330_6$ form a second set that is coupled to auxiliary controller $322_2$.

Figure 4:
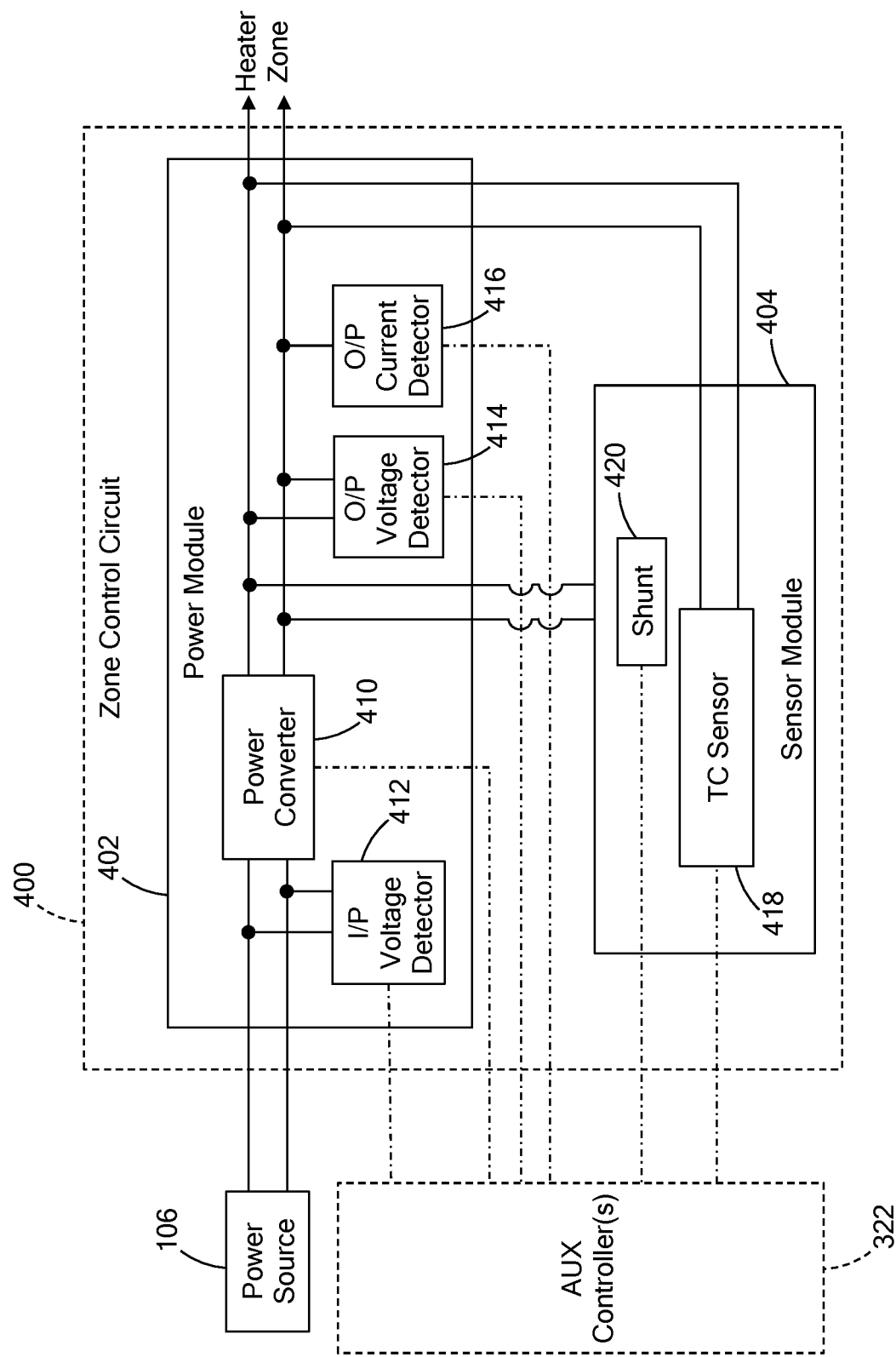
FIG. 4 is a block diagram of a zone control circuit of the control system.

In one form, the power modules 330 include a power converter, such as a buck converter, to provide adjustable power to the heater zone 304, and the sensor modules 332 include a voltage and/or current detector to measure the electrical characteristics. For example, referring to FIG. 4, an example zone control circuit 400 is configured to connect to a heater system having temperature sensing power pins that, as described above, utilizes a thermocouple junction for measuring temperature. In FIG. 4, the solid lines represent power and the dashed-dot-dashed lines represent data signals.

FIG. 4, the solid lines represent power and the dashed-dot-dashed lines represent data signals.

In one form, each zone control circuit 400 includes a power module 402 for providing adjustable power to a zone of the heater system and a sensor module 404 for measuring the electrical characteristics, such as change in voltage at the thermocouple junction. In one form, the power module 402 includes a power converter 410, such as a buck converter, that is operable by the auxiliary controller 322 to adjust an input voltage ($V_{IN}$) from the power source 106 to an output voltage ($V_{OUT}$) that is applied to the heating elements of the heater zone. For example, the power converter 410 includes a control switch (not shown) and a driver circuit (not shown) coupled to the control switch. The driver circuit receives a power control signal from one of the auxiliary controllers 322 and actuates the control switch based on the power control signal to adjust the power from the power source 106. One example of such a power converter is further described in co-pending application U.S. Ser. No. 15/624,060, filed Jun. 15, 2017 and titled "POWER CONVERTER FOR A THERMAL SYSTEM", which is commonly owned with the present application and the contents of which are incorporated herein by reference in its entirety.

The power module 402 further includes an input (i/P) voltage detector 412 to detect the amount of voltage being supplied to the power converter 410 (i.e., input voltage), an output (O/P) voltage detector 414 to detect the amount of voltage being supplied to the heater system (i.e., voltage output), and an output (O/P) current detector 416 to detect the amount of current to the heater system (i.e., current output). The detectors 412, 414, and 416 may include a successive approximation register (SAR) for measuring the voltage and/or current. The input voltage, the output voltage, and the output current are communicated to the auxiliary controllers 322 for further processing.

In addition to other electronic components, in one form, the sensor module 404 includes a thermocouple (TC) sensor 418 that measures the change in voltage at the thermocouple junction at the time of a measurement operation, and a shunt 420 to divert leakage current during the measurement operation. In one form, the TC sensor 418 includes an analog-to-digital converter to convert the measured voltage, which is typically in mV, to a digital value, and a high voltage FET to block voltage spikes. The sensor module 404 may include additional electronic components to measure other electrical characteristics related to performance of the control system, such as a temperature at the connector to which the temperature sensing power pins are connected, and/or a temperature of the circuit board upon which the electronic components are disposed. The measurements taken by the sensor module 404 are provided to the auxiliary controllers 322 for further processing.

While the sensor module 404 is configured for measuring voltage at the thermocouple junction defined by the temperature sensing power pins, the sensor module 404 may be configured for a two-wire heater system in which the resistance of the heating elements is determined by measuring at least one of voltage and/or current of the heating element of the heater zone. In such configuration, the sensor module may include a power metering chip for measuring the voltage and/or current (e.g., electrical characteristics) at the heating element. This data is then used by the auxiliary controllers 322 to determine resistance and/or an average temperature of the heating element.

Referring back to FIG. 3, the auxiliary controllers 322 are configured to control power and monitor performance of the heater zones 304 based on the electrical characteristics from the zone control circuits 320. Each of the auxiliary controllers 322 include electronics, such as one or more microprocessors, memory (e.g., RAM, ROM, etc) that stores computer readable instructions (i.e., software programs) executed by the microprocessor, and other suitable components. In one form, the number of auxiliary controllers 322 is selected based on the number of zones of the heater systems, and thus, should not be limited to two.

In one form, each auxiliary controller 322 includes a power controller $340_1$ and $340_2$ (collectively "power controllers 340") and a sensor controller $342_1$ and $342_2$ (collectively "sensor controllers 342"). In FIG. 3, different type of lines are used to distinguish between communication from the power controllers (solid lines) and from sensor controllers (dashed-dot-dashed lines). Each power controller 340 and each sensor controller 342 is coupled to the primary controller 324 for exchanging data. Each power controller 340 is coupled to a set of the zone control circuits 320 different from the other power controller 340. For example, in FIG. 3, the power controller $340_1$ is coupled to the zone control circuits $320_1$ to $320_3$, and more particularly to the power modules $330_1$ to $330_3$. The power controller $340_2$ is coupled to the zone control circuits $320_4$ to $320_6$, and more particularly to the power modules $330_4$ to $330_6$. The sensor controllers 342 are coupled to each other and to each of the zone control circuits 320, and more particularly, the sensor modules 332 of the zone control circuits 320. The sensor controllers 342 are also coupled to the power supply switch 326 for operating the switch 326 in the event of an abnormal performance detected by the sensor controllers 342.

In one form, the power controllers 340 receives an operation set-point for each heater zone 304 from the primary controller 324, and based on the operation set-point, the power controllers 340 outputs a power control signal to the respective power modules 330 for adjusting the power to the heater zones 304. In one form, the power control signal is a pulsed signal indicative of a duty cycle for actuating the control switch of the power converter. In addition to controlling power, the power controllers 340 receives signals from the input voltage detector, the output voltage detector, and/or the output current detector of the power modules 330, and determines the input voltage, the output voltage, and/or the output current. Such feedback information is transmitted to the primary controller 324 for further processing.

In one form, the sensor controllers 342 operate the zone control circuits 320 during a measurement operation to obtain electrical characteristics from each of the sensor modules 332. For example, during the measurement operation, the sensor controllers 342 operate the shunt of the sensor module 332 to divert leakage current and measure electrical characteristics of the heating element via, for example, the thermocouple junction. In another example, for a two-wire heater system, the sensor controllers 342 measures voltage and/or current of the heating element. In one form, each sensor controller 342 processes the electrical characteristics to determine performance characteristics of the heater zones 304, such as temperature at the thermocouple junction or resistance and/or temperature of the heating element. For example, using looks-up tables and/or predefined algorithm, the sensor controllers 342 may perform a thermal couple conversion (mV to Temp.), cold-junction compensation, a resistance measurement, and/or a resistance to temperature measurement. The sensor controllers 342 may also be configured obtain signals from the sensor modules 332 that are indicative of the temperature of the circuit board and/or of the shunt.

The sensor controllers 342 also perform one or more diagnostics, such as heater zone diagnostics and/or system diagnostics, for detecting abnormal performance. For example, a heater zone diagnostic may include the sensor controllers 342 determining whether the heating elements are operating at a respective temperature set-point and/or a respective resistance set-point defined by the primary controller. If a given heating element exceeds their respective set-point, the sensor controller 342 determines an abnormal performance of the heating element and may perform a protective measure. The system diagnostics may include the sensor controllers 342 performing a zone-to-zone diagnostic in which the difference in temperature between adjacent heater zones of the heater system 302 is monitored and if the difference exceeds a temperature variance threshold, the sensor controllers 342 determine an abnormal performance of the thermal system and may issue a protective measure. Another example of a system diagnostic includes monitoring the temperature of various components, such as the shunt, connector, and/or the circuit board, to determine if the temperatures exceed a respective threshold. If so, the sensor controller 342 determines an abnormal performance of the component and performs a protective measure. The protection measure performed may include notifying the primary controller 324 of the abnormal performance, operating the power supply switch 326, issuing an alert (audible and/or visual) to notify a technician, and/or other suitable measure.

In one form, each of the sensor controllers 342 perform a diagnostic verification check with respect to the measured electrical characteristics, the performance characteristics and/or diagnostics performed by the other sensor controller 342. For instance, the sensor controllers 342 determine whether the sensor modules 332 are providing accurate results by comparing the measured electrical characteristics provided to both controllers 342. In addition, the sensor controllers 342 verify the performance of the other sensor controller 342 by determining whether the calculated performance characteristics and/or diagnoses are the substantially the same. That is, if the sensor controller $342_1$ calculates a different temperature than the sensor controller $342_2$, both sensor controllers 342 are configured to detect the discrepancy, which can then be communicated to the primary controller 324. Accordingly, the sensor controllers 342 operate as a redundant diagnostic check to monitor the performance of the heater system 302 and of one another. While specific diagnostic examples are provided herein, the sensor controllers 342 may be configured other suitable diagnostics and/or system checks, and should not be limited to the ones described herein.

The primary controller 324 include electronics, such as one or more microprocessors, memory (e.g., RAM, ROM, etc) that stores computer readable instructions (i.e., software programs) executed by the microprocessor, and other suitable components. In one form, the primary controller 324 controls the operation of the heater system 302 based on input from a user, feedback data, and/or prestored control programs.

In one form, the primary controller 324 receives inputs from the user by way of a computing device (not shown) communicably coupled to the control system 100. The user may define one or more operational settings, such as rate of change of temperature or power; temperature limits for the heater system or the control system; resistance limits of the heating elements; power output limits of the control system; and/or other suitable settings. The feedback data provided to the primary controller 324, from the auxiliary controllers 322, include the input voltage, the output voltage, the output current, the electrical characteristics of each heating element, the performance characteristics of the heater system, and/or diagnostic results.

The control programs are computer executable programs for controlling the heater system 302 within set conditions and each program is defined by one or more operation settings that are defined by the user or predetermined in the control program. For example, control programs may include: a power-up control in which power is gradually provided to the heater system until the voltage output/current output reaches a predefined limit; a steady-state control in which the temperature of the heater system is controlled to a specific set-point; and a set-rate control in which the temperature of the heater system is increased at a set ramp rate. The primary controller 324 may include other control programs based on the heater system it is controlling, and should not be limited to the examples provided herein.

In accordance with the control program being performed, the primary controller 324 determines operation set-points for the heater system 302, such as a temperature set-point, a power set-point, set rate control, and/or duration. For example, the primary controller 324 defines temperature set-points for each zone of the heater system 302 and/or for an overall average temperature of the heater system 302. In another example, the primary controller 324 determines power set-points (e.g., power level amount in voltage and/or current) for each heater zone 304 of the heater system 302. It should be readily understood that primary controller 324 may define other operation set-points, and should not be limited to the examples provided herein.

In one form, the primary controller 324 transmits the operation set-point to the auxiliary controllers 322 during a heating operation and acquires the feedback data from the auxiliary controller 322 during a measurement operation. For example, during the heating operation, the power controllers 340 receive the operation set-points and apply a power control signal to the power converters of the power modules 330 to output a desired power to the heater zones 304. The power controllers 340 also measure the amount of power in the control system (i.e., the input voltage, the output voltage, and/or output current), and provides this information to the primary controller 324. For the measurement operation, the primary controller 324 transmits a measurement instruction to the sensor controller 342 to measure the electrical characteristics of the heating elements. In one form, upon receiving this instruction, the sensor controller 342 actuates the shunts of the zone control circuits 320 and measures electrical characteristics of the heating elements. The sensor controller 342 may further calculate the performance characteristics and perform one or more diagnostics, as described above. The data obtained by the auxiliary controllers 322 is transmitted to the primary controller 324.

The primary controller 324 is also configured to perform one or more diagnostics to detect possible abnormal performance of the thermal system. The primary controller 324 may perform similar diagnostics as those performed by the auxiliary controllers, and some additional diagnostics, such as user temperature limit control for determining whether the temperature of the heater system exceeds a user defined temperature limit, and an auxiliary control check for verifying the results of the sensor controllers 342. For example, using the electrical characteristics of the heating elements, the primary controller 324 may calculate the performance characteristics using, for example, a thermal couple conversion (mV to Temp.), cold-junction compensation, and/or resistance-temperature conversion for two-wire system. The primary controller 324 compares its calculated values with that of the auxiliary controllers 322 to determine if the values are substantially the same. If not, the primary controller 324 performs a protective measure, such as notifying the user of the abnormal performance and/or discontinuing power to the control system 300 by operating the power supply switch 326.

The control system of the present disclosure is configured for a heater system having power-sense capability to reduce the number of wires for providing power and sensing performance characteristics of the heater system. The control system includes multiple sensor controllers that are configured to perform sensor diagnostic checks to authenticate measured/calculated values determined by one another. In addition, the primary controller is configured to perform a similar diagnostic check to provide another layer of authentication of the measured values from the auxiliary controllers. Accordingly, discrete sensors for verifying the performance characteristics of a heater system may not be needed, thus, reducing complexity of the system.

It should be readily understood, that while specific example diagrams are provided for the control system, the system may include additional components not detailed in the diagram. For example, the control system includes components, such as the primary controller and the auxiliary controllers, that operate at a lower voltage than, for example, the power converters of the zone control circuits. Accordingly, the control system includes a low power voltage supply (e.g., 3-5V) for powering low voltage components. In addition, to protect the low voltage components from high voltage, the control system includes electronic components that isolate the low voltage components from the high voltage components and still allow the components to exchange signal.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for controlling a heater system having a plurality of resistive heating elements that define a plurality of heater zones, the control system comprising:
a plurality of zone control circuits configured to provide power to the plurality of resistive heating elements to have the plurality of resistive heating elements emit heat and to sense electrical characteristics of the plurality of resistive heating elements;
at least two auxiliary controllers coupled to the plurality of zone control circuits, wherein the at least two auxiliary controllers are configured to control power to the plurality of heater zones via the plurality of zone control circuits and monitor operation of the heater zones based on the electrical characteristics of the plurality of resistive heating elements; and
a primary controller coupled to the at least two auxiliary controllers, the primary controller being configured to provide an operation set-point for each of the heater zones based on the electrical characteristics, wherein the at least two auxiliary controllers operate the plurality of zone control circuits to supply power to the heater system based on the operation set-point, wherein:
each of the at least two auxiliary controllers includes a power controller and a sensor controller,
each power controller and each sensor controller is coupled to the primary controller, and
the sensor controllers are coupled to each other and to each of the plurality of zone control circuits.

2. The control system of claim 1, wherein each power controller is coupled to a set of the zone control circuits different from another power controller.

3. The control system of claim 1 further comprising a power supply switch configured to couple and decouple a power source to the control system.

4. The control system of claim 3, wherein:
the primary controller and the at least two auxiliary controllers are coupled to the power supply switch,
the primary controller and each of the at least two auxiliary controllers are configured to perform a system diagnostic, and
the primary controller and each of the at least two auxiliary controllers are configured to operate the power supply switch based on the system diagnostic, wherein the system diagnostic comprises performing a zone-to-zone diagnostic, the zone-to-zone diagnostic comprising:
determining a temperature difference between a pair of adjacent heater zones from among the plurality of heater zones; and
determining a performance characteristic of the heater system based on the temperature difference.

5. The control system of claim 1, wherein each of the zone control circuits includes a power module to provide power to the heater zone and a sensor module to measure the electrical characteristics of the heater zone.

6. The control system of claim 5, wherein each of the sensor modules is coupled to the at least two auxiliary controllers, and the power modules are provided in sets, such that each set of power modules is coupled to an auxiliary controller different from another set of power modules.

7. The control system of claim 1, wherein:
the at least two auxiliary controllers are configured to perform a diagnostic verification check based on the sensed electrical characteristics.

8. The control system of claim 1, wherein the at least two auxiliary controllers receive electrical characteristics from the zone control circuits, and based on the electrical characteristics calculate a performance characteristic, perform a system diagnostic, perform a diagnostic verification check, or a combination thereof.

9. A control system comprising:
a plurality of zone control circuits configured to provide power to a plurality of heater zones of a heater system and measure electrical characteristics of the heater zones;
at least two auxiliary controllers coupled to the plurality of zone control circuits, wherein the at least two auxiliary controllers are configured to control power to the plurality of heater zones via the plurality of zone control circuits, and wherein the at least two auxiliary controllers calculate a performance characteristic of the heater system based on the electrical characteristics, and wherein the at least two auxiliary controllers are configured to perform a diagnostic verification check to authenticate at least one of (i) the electrical characteristics measured by the at least two auxiliary controllers and (ii) the performance characteristic measured by the at least two auxiliary controllers;
a primary controller coupled to the at least two auxiliary controllers, wherein the primary controller provides an operation set-point for each of the heater zones of the heater system based on the performance characteristic of the heater system, wherein the primary controller is configured to selectively perform a protective action based on the diagnostic verification check; and
a power supply switch coupled to the primary controller and to each of the at least two auxiliary controllers, wherein the power supply switch is configured to couple and decouple a power source to the control system.

10. The control system of claim 9, wherein the primary controller executes one or more additional diagnostics to detect an abnormal performance, and wherein the primary controller operates the power supply switch to decouple the power source from the control system in response to detecting the abnormal performance.

11. The control system of claim 9, wherein:
each of the at least two auxiliary controllers includes a power controller and a sensor controller,
each power controller and each sensor controller is coupled to the primary controller, and
the sensor controllers are coupled to each other and to each of the plurality of zone control circuits.

12. The control system of claim 11, wherein each power controller is coupled to a set of the zone control circuits different from another power controller.

13. The control system of claim 9, wherein each of the zone control circuits includes a power module to control power to the heater zone and a sensor module to measure the electrical characteristics of the heater zone.

14. The control system of claim 13, wherein each of the sensor modules is coupled to the at least two auxiliary controllers, and the power modules are provided in sets, such that each set of power modules is coupled to an auxiliary controller different from another set of power modules.

15. The control system of claim 13, wherein each power module includes a power converter configured by an auxiliary controller from among the at least two auxiliary controllers to provide power to the heater zone of the heater system.

16. The control system of claim 13, wherein each sensor module is configured to measure a voltage, a current, or a combination thereof as the electrical characteristics of the heater zone.

17. The control system of claim 16, wherein each of the at least two auxiliary controllers is configured to calculate a temperature of the heater zone based on the electrical characteristics from the sensor module.

18. The control system of claim 9, wherein:
the plurality of heater zones are defined by a plurality of resistive heating, and
the plurality of zone control circuits is configured to provide power to the plurality of resistive heating elements to have the plurality of resistive heating elements emit heat and to sense electrical characteristics of the plurality of resistive heating elements.

19. A control system for controlling a heater system having a plurality of resistive heating elements that define a plurality of heater zones, the control system comprising:
a plurality of zone control circuits configured to provide power to the plurality of resistive heating elements to have the plurality of resistive heating elements emit heat and to sense electrical characteristics of the plurality of resistive heating elements;
at least two auxiliary controllers coupled to the plurality of zone control circuits, wherein the at least two auxiliary controllers are configured to control power to the plurality of heater zones via the plurality of zone control circuits and monitor operation of the heater zones based on the electrical characteristics, and wherein the at least two auxiliary controllers are communicably coupled to each other to exchange data and perform a diagnostic verification check based on the data exchanged; and
a primary controller coupled to the at least two auxiliary controllers, the primary controller being configured to provide an operation set-point for each of the heater zones based on the electrical characteristics, wherein:
the at least two auxiliary controllers are configured to operate the zone control circuits to supply power to the heater system based on the operation set-point, and
the primary controller is configured to selectively perform a protective action based on the diagnostic verification check.

20. The control system of claim 19, wherein:
each of the at least two auxiliary controllers includes a power controller and a sensor controller,
each power controller and each sensor controller is coupled to the primary controller, and
the sensor controllers are coupled to each other and to each of the plurality of zone control circuits.

21. The control system of claim 20, wherein:
each of the zone control circuits includes a power module to provide power to the resistive heating element and a sensor module to measure the electrical characteristics of the resistive heating element, and
each of the sensor modules is coupled to the at least two auxiliary controllers, and the power modules are provided in sets, such that each set of power modules is coupled to an auxiliary controller different from another set of power modules.

* * * * *